United States Patent
Zhou et al.

(10) Patent No.: US 9,108,846 B2
(45) Date of Patent: Aug. 18, 2015

(54) METHOD FOR PREPARING SULFURIC ACID BY USING HYDROGEN SULFIDE

(75) Inventors: Ren Zhou, Shanghai (CN); Rui Huang, Shanghai (CN)

(73) Assignee: Shanghai Keyontechs Co., Ltd., Fengjing Town, Jinshan Dist., Shanghai (CN)

( * ) Notice: Subject to any disclaimer, the term of this patent is extended or adjusted under 35 U.S.C. 154(b) by 0 days.

(21) Appl. No.: 14/130,354

(22) PCT Filed: Jun. 29, 2012

(86) PCT No.: PCT/CN2012/077968
§ 371 (c)(1),
(2), (4) Date: Mar. 25, 2014

(87) PCT Pub. No.: WO2013/004154
PCT Pub. Date: Jan. 10, 2013

(65) Prior Publication Data
US 2014/0205534 A1    Jul. 24, 2014

(30) Foreign Application Priority Data
Jul. 1, 2011  (CN) .......................... 2011 1 0184128

(51) Int. Cl.
*C01B 17/69* (2006.01)
*F28D 1/00* (2006.01)
(Continued)

(52) U.S. Cl.
CPC ............... *C01B 17/76* (2013.01); *C01B 17/508* (2013.01); *C01B 17/806* (2013.01);
(Continued)

(58) Field of Classification Search
CPC .......... C01B 17/69; C01B 17/806; F28D 1/00
USPC ................... 423/522; 165/172, 175
See application file for complete search history.

(56) References Cited

U.S. PATENT DOCUMENTS 2,071,598 A * 2/1937 Von Girsewald et al. ...... 423/522
2,880,018 A * 3/1959 Robinson et al. .............. 285/55
(Continued)

FOREIGN PATENT DOCUMENTS

| CN | 101152958 A |   | 4/2008 |              |
|----|-------------|---|--------|--------------|
| CN | 101618863 A | * | 1/2010 | ... C01B 17/74 |

(Continued)

OTHER PUBLICATIONS

Han "Producing Sulphuric Acid from Low-concentration H2S Gas—TOPSOE's wet-gas process of producing acid for avoiding energy consumption", Sulphuric Acid Industry S3: 11-14 and 22 (1980) ISSN 1002-1507.
Ye "Making Concentrated Sulphuric Acid with Wet Contact Process Taking Acidic Gas as Raw Material", Fuel & Chemical Processes 29(4): 210-212 (1998).

*Primary Examiner* — Timothy Vanoy
(74) *Attorney, Agent, or Firm* — Nixon Peabody LLP; David S. Resnick

(57) ABSTRACT

Provided is a method for preparing sulfuric acid by using hydrogen sulfide. The method comprises the following steps: (1) performing a reduction-oxidation reaction between an $H_2S$ feed gas and oxygen to prepare $SO_2$; (2) cooling the product acquired in step (1) to a temperature between 390° C. and 430° C., then performing a catalyzed oxidation reaction with oxygen; and (3) cooling the product acquired in step (2), then further cooling to a temperature between 60° C. and 120° C., collecting $H_2SO_4$ product. Also provided is a heat exchanger, comprising a housing and several glass pipes arranged within the housing along the direction of a long axis of the housing, arching between two lateral walls thereof; the adjacent glass pipes are connected head-to-tail. The method provides great hydrogen sulfide removal efficiency, simple process flow, and allows for economic efficiency of apparatus and reasonable utilization of energy.

17 Claims, 5 Drawing Sheets

(51) Int. Cl.
*C01B 17/76* (2006.01)
*F28F 21/00* (2006.01)
*C01B 17/50* (2006.01)
*C01B 17/80* (2006.01)
*F28F 9/10* (2006.01)
*F28F 19/00* (2006.01)
*F28D 7/16* (2006.01)
*F28F 19/04* (2006.01)
*F28D 21/00* (2006.01)

(52) U.S. Cl.
CPC ............... *F28D 7/1623* (2013.01); *F28F 9/10* (2013.01); *F28F 19/002* (2013.01); *F28F 21/006* (2013.01); *F28D 2021/0022* (2013.01); *F28F 19/04* (2013.01); *F28F 2230/00* (2013.01); *F28F 2265/26* (2013.01)

(56) References Cited

U.S. PATENT DOCUMENTS

| | | | | |
|---|---|---|---|---|
| 4,373,580 A | * | 2/1983 | Gossalter | 165/173 |
| 4,653,575 A | * | 3/1987 | Courchesne | 165/54 |
| 4,738,310 A | * | 4/1988 | Luttenberger et al. | 165/158 |

FOREIGN PATENT DOCUMENTS

| | | | | |
|---|---|---|---|---|
| CN | 102320579 A | | 1/2012 | |
| CN | 102384696 | | 3/2012 | |
| CN | 202166354 | | 3/2012 | |
| JP | 55-28757 A | * | 2/1980 | ............. B01D 53/34 |
| JP | 61-197410 A | * | 9/1986 | ............. C01B 17/74 |

* cited by examiner

METHOD FOR PREPARING SULFURIC ACID BY USING HYDROGEN SULFIDE

CROSS REFERENCE TO RELATED APPLICATIONS

This Application is a 35 U.S.C. §371 National Phase Entry Application of International Application No. PCT/CN2012/077968 filed Jun. 29, 2012, which designates the U.S., and which claims benefit under 35 U.S.C. §119(b) and 37 CFR 1.55(a) of China Application No. 201110184128.4, filed Jul. 1, 2011, the contents of each of which are incorporated herein by reference in their entireties.

TECHNICAL FIELD

The present invention relates to a method for preparing sulfuric acid with hydrogen sulfide.

BACKGROUND ART

Hydrogen sulfide ($H_2S$) is a by-product produced in the process of utilizing non-renewable energy resource such as coal, natural gas, petroleum and so on. Generally speaking, a lot of $H_2S$ is generated during the processes of natural gas purification, petroleum refining, coal gas utilization and coking. $H_2S$ is a colorless poisonous gas that smells like rotten eggs, and it is also strong neurotoxin which can cause intense stimulation to mucosa.

It is not allowed to release $H_2S$ acidic exhaust into the environment, and the maximum concentration of $H_2S$ in the environment is allowably 10 mg/$Nm^3$ according to China Environmental Standard "Health Standard for the Design of Industrial Enterprises" (TJ36-79). Claus process is the commonly-used method for treating $H_2S$ and recovering sulfur, which comprises the steps of reacting $H_2S$ with oxygen in the air to oxidize part of $H_2S$ into $SO_2$ and further reacting $H_2S$ with $SO_2$ in the volume ratio of 2:1 to produce sulfur. However, Claus process has many disadvantages, such as complex production process, long process flow, many equipments needed, the limitation of the process condition and high residual contaminants in tail gas. Especially, because the content of contaminants in tail gas doesn't meet the environmental protection standards, large devices for tail gas treatment are needed. Thus it can be seen that the equipments for Claus process is difficult to operate and the equipment investment and operation cost are also high. Given that about 90% of sulfur prepared by Claus process will be used to produce sulfuric acid, if $H_2S$ can be used to produce sulfuric acid directly, the equipment investment and production cost will be reduced, compared with Claus process for preparing sulfur and further preparing sulfuric acid with sulfur. The process for preparing sulfuric acid directly possesses following advantages, low equipment investment and low operation cost. At present, there is a great need for an effective method to produce sulfuric acid by using $H_2S$, which can provide great hydrogen sulfide removal, simple process flow, and allows for economic efficiency of equipments and reasonable utilization of energy.

SUMMARY OF THE INVENTION

The present invention aims to overcome the above-mentioned defects existing in Claus process that both equipment investment and operation cost are high and the operation is hard. The present invention provides a method for preparing sulfuric acid by using hydrogen sulfide, which provides great hydrogen sulfide removal rate, simple process flow, and allows for economic efficiency of equipments and reasonable utilization of energy.

The method for preparing sulfuric acid by using hydrogen sulfide comprises the following steps:

(1) performing a oxidation-reduction reaction between an $H_2S$ feed gas and oxygen comprised in an oxygen-rich air to prepare $SO_2$, controlling residual oxygen after the oxidation-reduction reaction step at a molar percentage of ≥2%; wherein, if the molar percentage of $H_2S$ in the $H_2S$ feed gas is ≥8%, the oxidation-reduction reaction is a combustion reaction, the reaction temperature of which is ≥900° C.; if the molar percentage of $H_2S$ in the $H_2S$ feed gas is <8%, the oxidation-reduction reaction is a catalyzed reaction, the initiation temperature of which is ≥200° C.;

(2) cooling the product acquired in step (1) to a temperature of 390° C.~430° C., and then performing a catalyzed oxidation reaction with oxygen, wherein the catalyzed oxidation reaction is performed in stages until the conversion rate of $SO_2$ is ≥98.7% or the outlet concentration of $SO_2$ is ≤550 mg/Nm;

(3) cooling the product acquired in step (2) to a temperature ≥10° C. over the dew point temperature of $H_2SO_4$, then further cooling to a temperature of 60° C.~120° C., collecting $H_2SO_4$ product, and subjecting the gas acquired after cooling to a coalescent separation before discharging directly into the atmosphere.

The method for preparing sulfuric acid by using hydrogen sulfide will be described in detail as follows:

(1) performing a oxidation-reduction reaction between an $H_2S$ feed gas and oxygen comprised in an oxygen-rich air to prepare $SO_2$, controlling residual oxygen after the oxidation-reduction reaction step at a molar percentage of ≥2%; wherein, if the molar percentage of $H_2S$ in the $H_2S$ feed gas is ≥8%, the oxidation-reduction reaction is a combustion reaction, the reaction temperature of which is ≥900° C.; if the molar percentage of $H_2S$ in the $H_2S$ feed gas is <8%, the oxidation-reduction reaction is a catalyzed reaction, the initiation temperature of which is ≥200° C.

In the present invention, the said $H_2S$ feed gas is the exhaust gas containing $H_2S$ commonly known in the art. Generally, the $H_2S$ feed gas is acquired from the process of utilizing non-renewable energy, such as coal, natural gas, petroleum and so on, or the $H_2S$ feed gas is acquired from the process of natural gas purification, petroleum refining, coal gas utilization and coking. The $H_2S$ content of $H_2S$ feed gas is usually at a molar percentage of 1%~90%, and preferably 5.2%~28.9%.

Wherein, when the $H_2S$ feed gas contains $NH_3$, the content of $NH_3$ is usually at a molar percentage of ≤15%, and preferably 1.2%. When the $H_2S$ feed gas contains $NH_3$ and the molar percentage of $H_2S$ in $H_2S$ feed gas ≥8%, is the reaction temperature of combustion reaction is preferably ≥1250° C.; when the molar percentage of $H_2S$ in $H_2S$ feed gas is <8%, the oxidation-reduction reaction is a catalyzed reaction, and $NH_3$ also undergoes the catalyzed reaction, the reaction condition of which is the same as the reaction condition of $H_2S$ catalyzed reaction. Catalysts commonly used in the art can be utilized in the said catalyzed reaction. Thereby, it can be realized that $NH_3$ is split completely, and it can avoid that ammonium salt clogs the catalyst bed.

In the present invention, the said oxygen-rich air is the air with the molar percentage of oxygen ranging between 20.8% and 100%, and it can be prepared by mixing pure oxygen with air. For example, air is mixed with oxygen in the ratio that air to oxygen is 7:1 so as to prepare a oxygen-rich gas with 30% of oxygen. According to the $H_2S$ content of the $H_2S$ feed gas as well as the amount of residual oxygen after reaction, a person skilled in the art can work out the specific content of oxygen in the oxygen-rich gas, for example, when the $H_2S$ content is at a molar percentage of 8%-15%, the oxygen content of the oxygen-rich gas is at a molar percentage of 28%.

In the present invention, when the said oxidation-reduction reaction is a combustion reaction, the reaction temperature is preferably 1050° C., and the $H_2S$ content of $H_2S$ feed gas is preferably at a molar percentage of 8%~90%. When the said oxidation-reduction reaction is a catalyzed reaction, the $H_2S$ content of the $H_2S$ feed gas is preferably at a molar percentage of 1%~8%.

In the present invention, the catalyst used in the catalyzed reaction is conventional in the art, and it usually is γ-aluminum oxide-based catalyst. Fixed-bed reactor is applied in the catalyzed reaction, wherein, the catalyst is placed on the grid tray at the bottom of the fixed-bed reactor. Both the catalyst and the fixed-bed reactor are commercially available.

In the present invention, the residual oxygen after the oxidation-reduction reaction step is preferably at a molar percentage of 2%~10%, more preferably at a molar percentage of 2%~6%, and further more preferably at a molar percentage of 2%-3%.

In the present invention, the equipments carried out the oxidation-reduction reaction between an $H_2S$ feed gas and oxygen in an oxygen-rich gas are all conventional in the art. There is no need for fuel and the like in this step, so the energy consumption is low.

(2) cooling the product acquired in step (1) to a temperature of 390° C.~430, and then performing a catalyzed oxidation reaction with oxygen, wherein the catalyzed oxidation reaction is performed in stages until the conversion rate of $SO_2$ is ≥98.7% or the outlet concentration of $SO_2$ is ≤550 mg/Nm³.

In the present invention, the cooling temperature for the product acquired in step (1) is preferably 410° C.-420° C.

In the present invention, the oxygen content involved in the catalyzed oxidation reaction of step (2) is preferably at a molar percentage of ≥5%, and more preferably at a molar percentage of 5%-7%, the content of $SO_2$ is preferably at a molar percentage of ≤4%. A person skilled in the art can adjust the content of oxygen according to the amount of residual oxygen in step (1) and the requirement of step (2).

In the present invention, the number of reaction order of the catalyzed oxidation reaction is preferably 2~5, and more preferably 3~4.

In the present invention, the catalyzed oxidation reaction is performed in stages until the conversion rate of $SO_2$ is preferably ≤99%.

In the present invention, the catalyst used in the catalyzed oxidation reaction is conventional in the art, and it usually is vanadium-based catalyst. Fixed-bed reactor is applied in the catalyzed oxidation reaction, wherein, the catalyst is placed on the grid tray at the bottom of the fixed-bed reactor.

In the present invention, nitrogen of the air reacts with oxygen to generate a small amount of $NO_2$ under the condition of high temperature. When $H_2S$ feed gas contains $NH_3$, the $NH_3$ will react to form $NO_2$ under the condition of high temperature. So the inventors of present invention found following results after a large amount of research and experiments, when $H_2S$ feed gas contains $NH_3$, it is preferable to add 50-100 ppmV ammonia to carry out the catalyzed oxidation reaction, and a denitrification reaction is performed between ammonia and $NO_2$ to generate $N_2$. The said denitrification reaction is a catalyzed reaction, catalysts used in the catalyzed reaction are conventional in the art, and they usually are vanadium-based catalysts (such as $V_2O_5$ and so on) and $WO_3$ catalysts, which can be filled in fix-bed reactor. Catalysts are all commercially available.

In the present invention, conventional cooling methods can be applied in the said cooling step, and it is preferable that cooling by heat exchanger or cooling by adding air directly. If the heat exchanger is used for cooling, it is preferable to use cold process gas or mesolow saturated vapor as cooling medium so as to recycle heat and produce superheated vapor. The superheated vapor will be used as tubor-powder to drive compressor to work so that energy consumption can be reduced. The equipments carried out the catalyzed oxidation reaction are conventional equipments in the art, such as multi-stage heat-transfer-reactor, and horizontal multi-stage reactor is preferable.

(3) cooling the product acquired in step (2) to a temperature ≥10° C. over the dew point temperature of $H_2SO_4$, then further cooling to a temperature of 60° C.~120° C., collecting $H_2SO_4$ product, and subjecting the gas acquired after cooling to a coalescent separation before discharging directly into the atmosphere.

In the present invention, the cooling temperature of the product acquired in step (2) is preferably 10° C.-30° C. over the dew point temperature of $H_2SO_4$. The term "dew point temperature" as used herein refers to the temperature at which $H_2SO_4$ vapor is cooled to the saturated $H_2SO_4$ solution under the condition of constant atmospheric pressure. The said temperature "≥10° C. over the dew point temperature of $H_2SO_4$" refers to the temperature ≥(the dew point temperature of $H_2SO_4$+10° C.), "10° C.-30° C. over the dew point temperature of $H_2SO_4$" refers to the temperature range from (the dew point temperature of $H_2SO_4$+10° C.) to (the dew point temperature of $H_2SO_4$+30° C.).

In the present invention, it is preferable to further cool to a temperature of 105° C.-120° C.

In the present invention, heat exchanger commonly-used in the art can be applied to cool the product acquired in step (2) to a temperature ≥10° C. over the dew point temperature of $H_2SO_4$. In addition, cold process gas or mesolow saturated vapor can be used as cooling medium to produce saturated vapor with high pressure or superheated vapor for other use so that energy consumption can be reduced. Wherein, the mesolow saturated vapor refers to a saturated vapor with the pressure of 0.5 MpaG to 7.8 MpaG.

In the present invention, coalescent separator commonly-used in the art can be applied to the said coalescent separation.

The concentration of $H_2SO_4$ product acquired in the present invention is 93%~98% by weight. According to the specific requirement, the concentration of $H_2SO_4$ product can be further adjusted to constant concentration and industrial-grade concentrated sulfuric acid is made for easy use.

The method for preparing sulfuric acid by using hydrogen sulfide as mentioned herein can be used to produce high pressure saturated vapor or superheated vapor. The superheated vapor, the yield of which is 0.8~1.2 ton vapor/ton sulfuric acid, can be used to drive compressor to turbine, so that about 8000 Kw·h electricity can be saved every day.

In the present invention, a heat exchanger is preferably used for further cooling the product acquired in step (2) to a temperature of 60° C.~120° C. The heat exchanger comprises housing, on the top of which there is an exhaust port, and at the bottom of which there is a liquid outlet. There are several glass pipes for the circulation of cooling medium along the long axis of the housing on the inside of the housing. The said glass pipes span over from one sidewall of the housing to the other. The end of the glass pipe that is in the upstream of cooling medium is called the head end, and the other end of the glass pipe that is in the downstream of cooling medium is called the tail end. Adjacent glass pipes between the upstream and downstream of cooling medium are connected head-to-tail to form at least one unidirectional flow path of cooling medium. The unidirectional flow path of cooling medium formed by glass pipes can be resistant to heat and corrosion so as to avoid deformation and corrosion under the condition of high temperature and strong corrosion. Thus it can ensure that the cooling medium flows fluently and the heat exchanger is used safely. Moreover, the length of the glass pipes is shortened and the rigidity of the glass pipes is improved by arranging the glass pipes across the sidewalls of the housing transversely along the long axis of the housing, thereby the problems that the glass pipes are fragile and crackly, and have little resistance to thermal shock can be solved. Heat-resistant and corrosion-resistant glass can be used for preparing the above-mentioned glass pipes, for example, but not limited to borosilicate glass, quartz glass and other well-known heat-resistant and corrosion-resistant glasses.

It should be noted that if the housing is in the shape of a cylinder, the axis extension direction of the cylinder is the long axis direction of the housing, and the surface formed by rotating the cylinder around the axis is the said sidewall.

Besides, both head end and tail end of the glass pipes can be located inside of the housing, in such case, both the head end and the tail end are connected via adapted glass pipes. The shape of the flow path of cooling medium is, for example, but not limited to the shape of "弓", the shape of "Z" or other shapes.

Wherein, there is a cooling medium inlet and a cooling medium outlet on the flow path, and the inlet is near to the top and the outlet is near to the bottom. In particular, when the cooling medium is air, the designing style of entering at top and leaving at bottom is consistent with the feature that cold air usually goes down, and further improves fluidity and speed of the cooling medium, thereby increase the condensation efficiency.

In order to make the length of the glass pipes shortest, the extension direction of the glass pipes is vertical with the long axis direction (i.e. parallel with the short axis direction of the heat-changer), and both head ends and tail ends of the glass pipes extend to the outside of corresponding sidewalls. In this case, the two ends can be connected outside of the housing, which is more convenient.

In particular, if the heat exchanger is vertical heat exchanger, the glass pipes that are held horizontally can bear stress evenly, and they are easy to install and not easy to be crumbled.

Preferably, the said glass pipes, which are uniformly distributed, are divided into several glass pipes units along the long axis direction; the head ends of the glass pipes in each unit are on the same side and form the head end of the glass pipes unit, and the side of the tail ends of the glass pipes in each unit forms the tail ends of the unit. The tail end and the head end of the adjacent glass pipes unit which lay between the upstream and downstream of cooling medium are arranged in dislocation and connected via a pipe-box. This structure can effectively increase the flow area of cooling medium, enhance the input of cooling medium per unit time, and increase the cooling efficiency. Besides, it can effectively save installation time and improve the production efficiency of heat exchanger that the glass pipes is divided into several units and the adjacent units are connected via a pipe-box. Furthermore, heat exchange of the heat exchanger will be more even by distributing the glass pipes evenly.

The arrangement type of glass pipes in each glass pipes unit can be matrix or emanative. Moreover, the number of glass pipes in one unit can be equal to or unequal to which of the adjacent unit, without limitation.

The said pipe-box can be connected to the corresponding sidewall via dismountable fasteners such as bolts, so that the pipeline and glass pipes are easy to clean.

Wherein, adjacent glass pipes are connected to each other via U-shaped pipes. The U-shaped pipe plays an important role in guiding the cooling medium in glass pipes, and facilitates to avoid forming turbulent flow at the intersection of two glass pipes. The material of U-shaped pipe can be rubber, metal or glass. In addition, a person skilled in the art can use other pipe connectors to join the head ends and tail ends of the glass pipes up.

Wherein, the inlet and the outlet of cooling medium are set on two pipe-boxes separately.

Wherein, the two ends of glass pipes are set through in one fastener, wherein the fastener is set through the said sidewall.

Wherein, there is interval coordination between the fastener and the sidewall; there is also a O-type seal ring arranged between the fastener and the corresponding internal surface and/or external surface of the sidewall. There is interval coordination between the fastener and the sidewall, that is to say, the external diameter of the fastener is slightly greater than the bore diameter of the corresponding installation position on the sidewall. On one hand, it is beneficial to assemble the glass pipes, on the other hand, and more importantly, the shear force can be eliminated so as to prevent glass pipes from breaking, wherein, the said shear force is imposed on the fastener and the glass pipes due to thermal expansion of the housing and the interlining material of the housing.

Wherein, there is a filter mechanism for collecting liquid particles on the upstream of the outlet. There are liquid particles existing inevitably in the exhaust gas treated with condensation, so the filter mechanism is needed to filter the exhaust gas so as to avoid liquid particles being discharged to the atmosphere.

Preferably, the said filter mechanism is a fiber filtration board.

Wherein, there is an anti-corrosive layer on the inner wall of the housing. The said structure can protect the housing from corrosion and increase the service life of the housing.

Preferably, the anti-corrosive layer is a polytetrafluoroethylene sheet.

Wherein, the part of the housing that is near to the liquid outlet is diminishing gradually along the direction of the liquid discharge, which facilitates to recycle viscous condensate product and avoids adhesion phenomenon on the inner wall of the housing.

Wherein, the above-mentioned preferable conditions of the heat exchanger can be combined randomly, and then the preferable heat exchangers of the present invention can be obtained.

In regard to the preferable heat exchangers of the present invention, the material of heat exchange pipes is glass pipes, which replaces precious metals or polytetrafluoroethylene, and unidirectional flow path of cooling medium is formed, and these design increase the service life of the heat exchangers in a environment of high-temperature and strong corrosion. The length is shortened and the rigidity is improved by spanning the glass pipes over the sidewalls. Further, unidirectional flow path of cooling medium from top to bottom can avoid the cooling medium being turbulent in the path, and thereby heat exchange efficiency of the heat exchangers is increased.

Furthermore, the liquid strong-corrosive liquid medium flows to the bottom of the housing after condensation, and meets strong-corrosive gas medium with high temperature imported from the bottom of the housing as well as the cooling medium after heat exchanging at the bottom of the housing. Affected by the high temperature of the gas medium and the cooling medium, moisture of strong-corrosive liquid medium is further evaporated, and thereby the concentration of the condensate is increased. Moreover, because the heat exchange efficiency is increased and the product is cooled sufficiently, the discharge temperature of cooling medium is higher than the temperature disclosed in the prior art. The heat energy can be recycled by using the commonly-used recovery device, as a result, the heat energy can be saved. So the method is energy-saving and environment friendly.

Reagents and raw materials used in the present invention are all commercially available.

On the basis of complying with the common knowledge in the present art, the above-mentioned preferable conditions of the technical features can be combined with one another randomly to obtain the preferable examples of the present invention.

The present invention can reach advantageous technical effects as follows. The present invention method for preparing sulfuric acid with hydrogen sulfide possesses following advantages. The removal efficiency of $H_2S$ is increased, and the $H_2S$ content of exhaust gas is less than 10 ppmV which is much lower than the provision of current environmental standard. If the exhaust gas contains other pollutants, for example, but not limited to $SO_2$, $SO_3$ and $NO_2$, the contents thereof are all lower than what is prescribed in current environmental standard GB16297-1996. The technological process arrangement is reasonable and simple, the economic benefits are sufficient, and resources utilization efficiency is high. In particular, high borosilicate glass exchanger pipes are held horizontally, as a result that the equipment is easy to operate, the cost of the equipment is decreased, the energy is saved and the environment is friendly.

EMBODIMENT

The present invention will be illustrated by examples as follows, but it should be understood that the present invention is not limited to the scope of the examples.

Example 1

The Heat Exchanger of the Present Invention

For convenience sake, a vertical heat exchanger is used to illustrate the present invention. The expressions "left" and "right" mentioned hereinafter are consistent with the left and right of FIG. 1 itself, but it shouldn't be interpreted as the limitation to the present invention. The shape of "O" and the shape of "X" in drawings represent two glass pipes whose flow directions are opposite.

Figure 1:
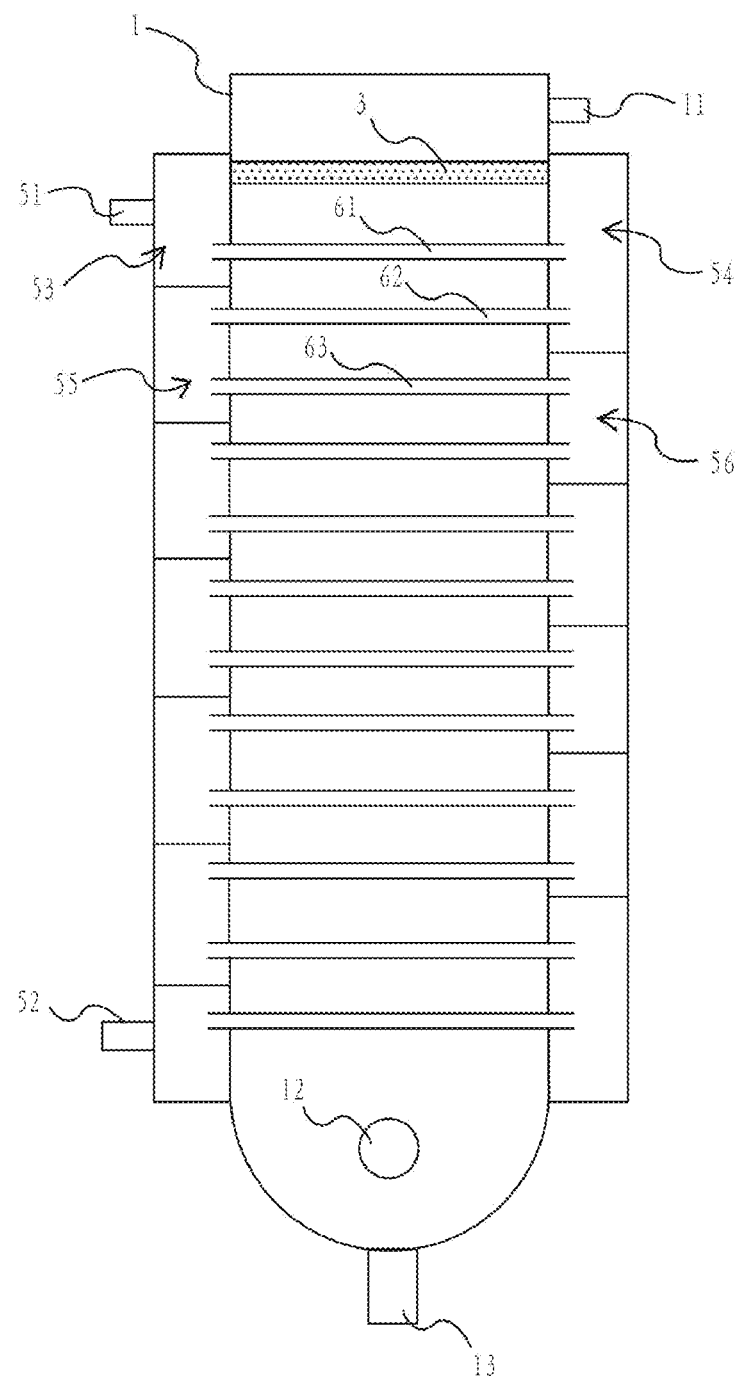
FIG. 1 is the structure schematic diagram of heat exchanger in Example 1 of the present invention.

Similar to the prior art, as it can be seen from FIG. 1, the heat exchanger of the present example comprises a rectangular housing 1, on the top of which there is an exhaust port 11, and at the bottom of which there is an inlet port 12 to import sulfuric acid vapor. There is a liquid outlet 13 beneath inlet port 12 used for discharging the cooled concentrated sulfuric acid. Wherein, the shape of the bottom of housing 1 is a semicircle, and the liquid outlet 13 is at the bottom of the circle structure. Also, the shape of the bottom of housing 1 can be any other shape that is diminishing gradually along the direction of liquid discharge, such as inverted triangle or inverted trapezoid. Besides, there is a fiber filtration board 3 used as a filter mechanism on the upstream of exhaust port 11, which is used for collecting liquid particles in tail gas generated after filtering and condensing.

Figure 2:
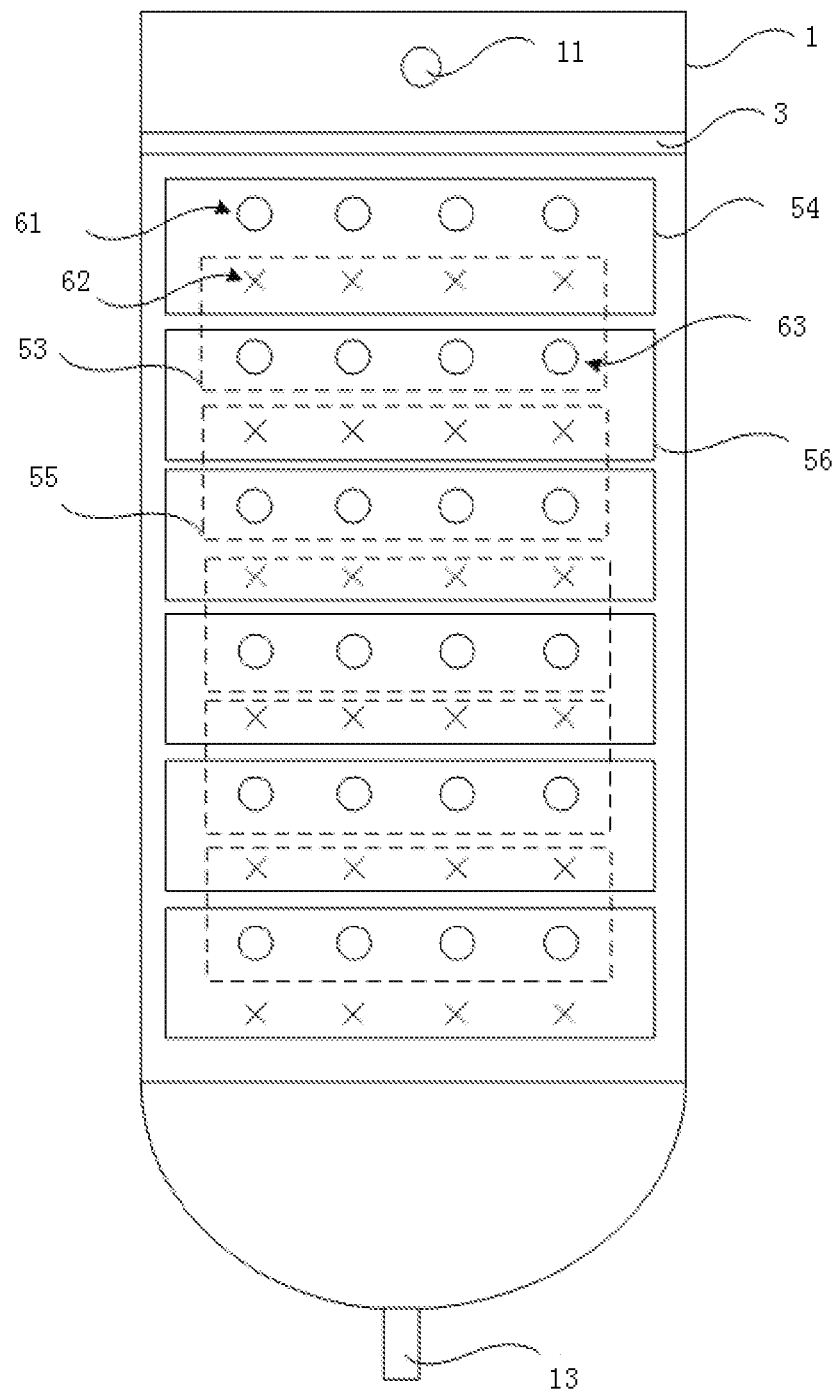
FIG. 2 is structure schematic diagram of the right side of heat exchanger in FIG. 1.

It is different from the prior art, as it can be seen from FIGS. 1 and 2, several glass pipes are arranged between left sidewalls and right sidewalls, and the glass pipes are arranged along the direction of the long axis (i.e. vertical direction in FIG. 1). In Example 1, the glass pipes are uniformly distributed and divided into twelve glass pipes units along the long axis direction, each glass pipes unit comprises several glass pipes distributed along horizontal plane. The head ends of the glass pipes in each unit are on the same side of housing 1 to form the head end of the glass pipe unit, likewise, and the tail ends of the glass pipes in each unit constitute the tail ends of the glass pipe unit. In addition, the tail end and the head end of the adjacent unit are placed in dislocation and connected via a pipe-box on the exterior wall of housing 1, wherein, the units are between the upstream and downstream of cooling medium, in other words, the units are adjacent to each other in vertical direction. There is a cooling medium inlet 51 on pipe-box which is on the top of all the pipe-boxes, and a cooling medium outlet 52 on pipe-box which is on the bottom of all the pipe-boxes, so cold air can enter the heat exchanger from left to right, and flow from top to bottom.

Specifically, several pipe-boxes are arranged in up-and-down dislocation on the left sides and right sides. The head end of the first glass pipes unit 61 from the top to the bottom is located inside of the first pipe-box 53 that is on the top of the left side, and the tail end of unit 61 is located inside of the second pipe-box 54 that is on the top of the right side. The head end of the second glass pipes unit 62 from the top to the bottom is located inside of the second pipe-box 54, and the tail end of unit 62 is located inside of the third pipe-box 55 beneath the first pipe-box 53. The head end of the third glass pipes unit 63 from the top to the bottom is located inside of the third pipe-box 55, and the tail end of unit 63 is located inside of the fourth pipe-box 56 beneath the second pipe-box 54, and the like, thereby the unidirectional flow path of cooling medium with multiple passages can be formed.

All of the pipe-boxes are connected to the housing via bolts. Besides, the pipe-boxes on the same side can be formed as one whole body, which comprises a basic body structure stretching from upward side above the first glass pipes unit 61 to the last glass pipes unit, and the room formed by the basic body structure and sidewalls is separated into independent air-deflecting chambers by several air deflectors. Adjacent units are connected to each other via the said air-deflecting chamber, and the specific connection type is as above-mentioned.

Figure 3:
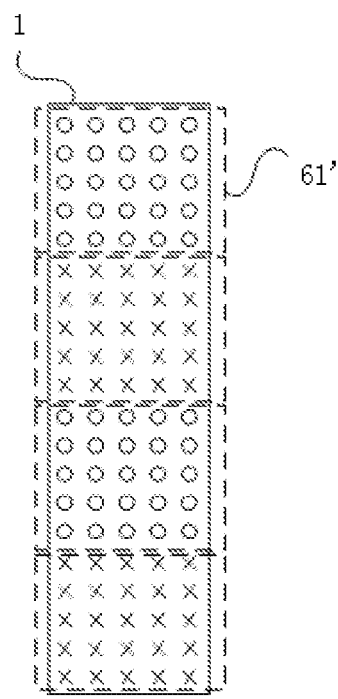
FIG. 3 is another structure schematic diagram of glass pipes unit in Example 1 of the present invention.

In addition, as it can be seen from FIG. 3, the arrangement of glass pipes in glass pipes unit 61 can also be distributed in three-dimensional space in matrix form, so that the space can be saved meanwhile air flow area can be increased, and the flow rate and cooling efficiency can also be enhanced.

Figure 4:
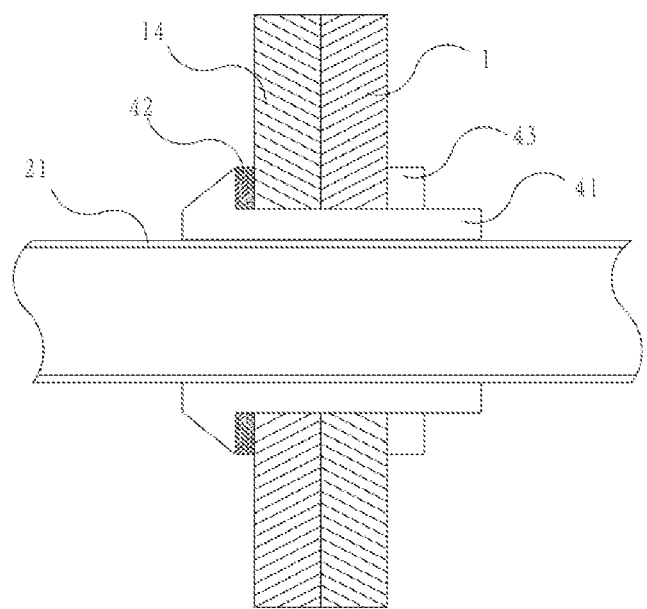
FIG. 4 is the structure schematic diagram showing the connection relationship between glass pipes and housing in Example 1 of the present invention.

In addition, as it can be seen from FIG. 4, a polytetrafluoroethylene sheet 14 used as an anti-corrosive layer is arranged on the inner surface of housing 1. It is used for preventing housing 1 from contacting with highly corrosive materials directly.

The connection relationship between glass pipes and housing 1 will be illustrated with reference to FIG. 4, and glass pipe 21 is taken as an example.

Bolt 41 is arranged through the end of glass pipe 21, while bolt 41 is arranged through housing 1 and fixed on housing 1 by nut 43. Wherein, there is interval coordination among bolt 41, the sidewall of housing 1 and the polytetrafluoroethylene sheet 14 on the internal surface of sidewall, so that there is a expansion space for polytetrafluoroethylene sheet 14. Thereby it can be avoided that bolt 41 and glass pipe 21 are squeezed and glass pipe 21 is broken caused by thermal expansion of polytetrafluoroethylene sheet 14. There is also a seal ring 42 arranged between the bolt 41 and polytetrafluoroethylene sheet 14, so as to seal the installation site of glass pipe 21 effectively and prevent sulfuric acid vapour from leaking through the assemble site.

It should be noted that the number of glass pipes in the housing can be adjusted according to the actual situation. For example, there are less glass pipes in heat exchanger with small size used in laboratory, whereas there are more glass pipes heat exchanger with large size used for mass production.

In Example 1, the length, width and height of housing 1 are 2 m, 1.5 m and 8 m respectively. There are 3250 glass pipes totally in the twelve glass pipes units, and the length of each pipe is 1.6 m.

Example 2

Acidic gas contained $H_2S$ is composed of 25.1% of $H_2S$, 0.94% of COS, 73.36% of $CO_2$, 0.48% of $CH_4$, and 0.12% of $CH_3OH$, all by molar percentage.

Figure 5:
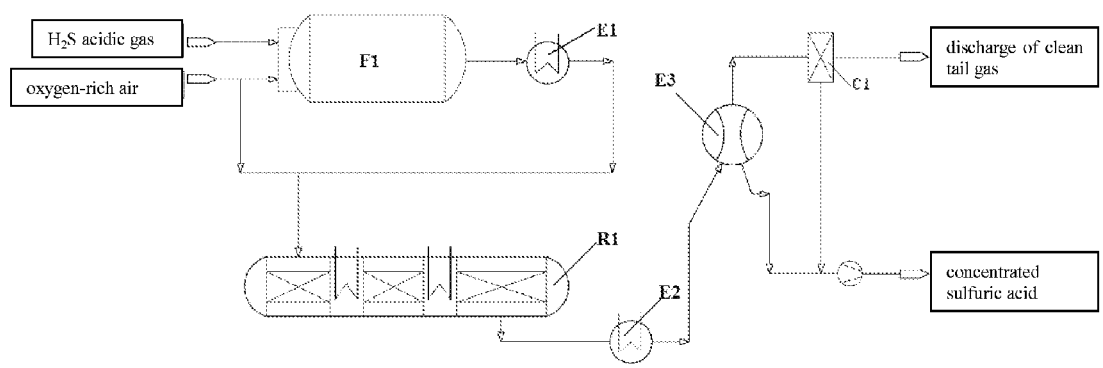
FIG. 5 is the process flow diagram of the processing method in Example 2 of the present invention.

The process flow diagram of Example 2 is shown in FIG. 5.

(1) a combustion reaction was carried out between the feed gas and air at a temperature of 1050° C. in the reactor F-1, the molar percentage of oxygen in process gas was 3% after reaction, $H_2S$ contained in the feed gas was oxidized into $SO_2$ completely by the combustion reaction, meanwhile a lot of $H_2O$ was generated;

(2) hot process gas was transported to heat exchanger E-1 to cool down, the released heat energy was used for producing saturated vapor with middle pressure or high pressure. The cooled process gas was supplemented with air to increase oxygen concentration in process gas, meanwhile the content of $SO_2$ was adjusted to 4%. Then the process gas with the content of oxygen >7% was sent into a multistage catalytic reactor R-1 at the temperature of 410° C., and $SO_2$ is catalyzed to $SO_3$, the heat energy of process gas was removed by heat-exchanging between stages. After cooling down, the process gas was sent into the next stage to carry out a further reaction, the number of reaction stages is 4; conversion rate of $SO_2$ at the outlet of catalytic reactor is 99.2%;

(3) process gas was further cooled down to 275° C. in heat exchanger E-2 (the heat exchanger in Example 1), which is 15° C. higher than the dew point temperature of sulfuric acid. And then process gas was further cooled down to 105° C. in heat exchanger E-3, in order that $SO_3$ and $H_2SO_4$ vapor were absorbed completely and congealed. The concentrated sulfuric acid at the bottom of heat exchanger E-3 was discharged out of the boarder area after cooling down and adjusting the content; noncondensable gas at the outlet of E-3 was congealed via condensate separator C-1 and the $H_2SO_4$ aerosol was collected from the noncondensable gas, and then noncondensable gas was sent to chimney to release. The pollutants concentrations strictly meet environmental protection standard, i.e. the content of $NO_2$ is 60 mg/Nm$^3$, the content of $SO_2$ is 520 mg/Nm$^3$, and the content of $H_2S$ is less than 10 ppmV.

Example 3

Acidic gas contained $H_2S$ is composed of 28.9% of $H_2S$, 1.2% of COS, 68.59% of $CO_2$, 1.2% of $CH_4$, 0.13% of $CH_3OH$, and 1.2% of $NH_3$, all by molar percentage.

Figure 6:
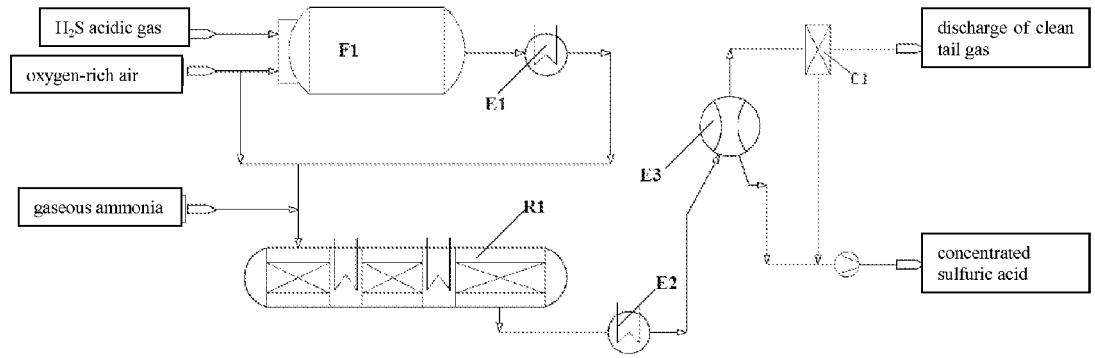
FIG. 6 is the process flow diagram of the processing method in Example 3 of the present invention.

The process flow diagram of Example 3 is shown as FIG. 6.

(1) because the acidic gas contained $NH_3$, the reaction temperature needed to be increased so that $NH_3$ can be reacted completely. Thereby it avoided that reaction between $NH_3$ and $SO_2$ leads to short-time inactivation of catalyst, and also, it avoids that ammonium salt generated by the reaction of $NH_3$ and $SO_2$ blocked the pipes and catalyst bed, and further led to difficult operation of the system. Combustion reaction was performed between the acidic gas and the oxygen-rich gas with 30% of oxygen in F-1, wherein, the oxygen-rich gas was prepared by mixing air with oxygen in ratio that air to oxygen is 7:1. In such a condition, the reaction temperature in F-1 reached 1250° C., which met the requirement of ammonia-burning process. After the reaction, $H_2S$ was oxidized into $SO_2$ completely and $NH_3$ was transferred into $NO_2$, meanwhile a lot of $H_2O$ was generated;

(2) hot process gas was transported to E-1 to cool down, the released heat energy was used for producing saturated vapor with middle pressure or high pressure. The cooled process gas was supplemented with air to increase oxygen concentration in process gas, meanwhile the content of $SO_2$ was adjusted to 4%, and the process gas was supplemented with 50-100 ppmV of ammonia. And then process gas with the content of oxygen >7% was sent into a multistage catalytic reactor R-1 at the temperature of 415° C., and the $NO_2$ generated in the above-mentioned combustion reaction is transformed to $N_2$. Afterwards $SO_2$ was transferomed into $SO_3$ by catalyzed oxidation reaction. The heat energy of process gas was removed by heat-exchanging between stages, and after cooling down, the process gas was transferred into the next stage to carry out a further reaction, the number of reaction stages is 2; conversion rate of $NO_2$ is 95% and conversion rate of $SO_2$ is 99.2% at the outlet of R-1;

(3) process gas was further cooled down to 280° C. in E-2 (the heat exchanger in Example 1), which is 17° C. higher than the dew point temperature of sulfuric acid. And then process gas was further cooled down to 110° C. in E-3, in order that $SO_3$ and $H_2SO_4$ vapor were absorbed completely and congealed. The concentrated sulfuric acid at the bottom of E-3 was discharged out of the boarder area after cooling down adjusting the content; noncondensable gas at the outlet of E-3 was congealed via C-1 and the $H_2SO_4$ aerosol was collected from the noncondensable gas, and then noncondensable gas was sent to chimney to release. The pollutants ($NO_2$, $SO_2$, $SO_3$) concentrations strictly meet environmental protection standard, wherein the content of $H_2S$ is less than 10 ppmV.

Example 4

Acidic gas contained $H_2S$ is composed of 5.2% of $H_2S$, 0.8% of COS, 92.6% of $CO_2$, 1.2% of $CH_4$, and 0.2% of $CH_3OH$, all by molar percentage.

Figure 7:
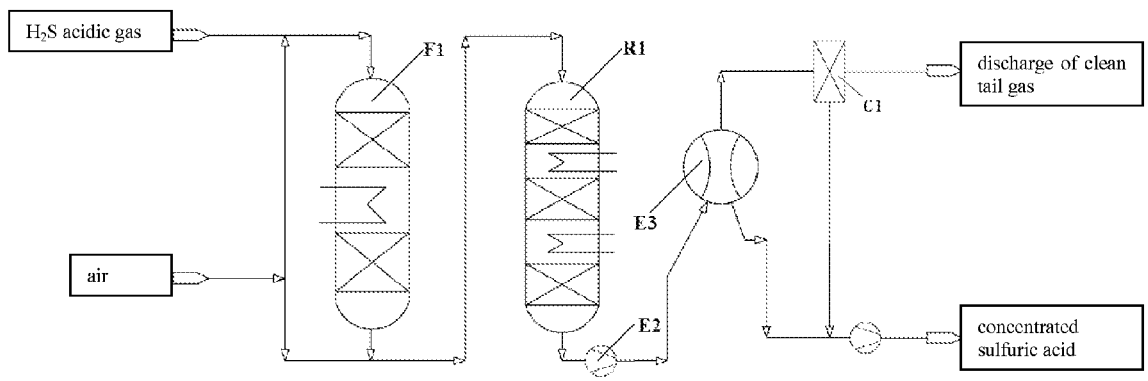
FIG. 7 is the process flow diagram of the processing method in Example 4 of the present invention.

The process flow diagram of Example 4 is shown as FIG. 7.

(1) a catalyzed oxidation reaction was performed between the acidic gas contained low concentration of H₂S and air in the presence of catalyst in F-1, the initial temperature of the reaction was 210° C. and the end temperature of the reaction was 445° C. In order to avoid the temperature of catalyst bed rising sharply caused by heat releasing of the catalyzed oxidation reaction, 2-stage reaction was adopted and heat-exchanging between stages was used to cool down the process gas. The oxygen content in process gas was 2% after reaction. $H_2S$ in acidic feed gas was oxidized to $SO_2$ completely by catalyzed oxidation reaction, meanwhile a lot of $H_2O$ was generated;

(2) the cooled process gas was supplemented with air to increase oxygen concentration in process gas, meanwhile the $SO_2$ content was adjusted to 4%. The process gas, whose temperature was decreased to 420° C. and the $O_2$ concentration of which was increased to 5%, was sent into a multistage catalytic reactor R-1 to catalyze $SO_2$ to $SO_3$, the heat of process gas was removed by heat-exchanging between stages, and after cooling down, the process gas was sent into the next stage to carry out a further reaction, the number of reaction orders is 3. Conversion rate of $SO_2$ at the outlet of R-1 is 98.7%;

(3) process gas at the outlet was further cooled down to 260° C. in E-2 (the heat exchanger in Example 1), which is 15° C. higher than the dew point temperature of sulfuric acid. And then process gas was further cooled down to 120° C. in E-3, in order that $SO_3$ and $H_2SO_4$ vapor were absorbed completely and congealed. The concentrated sulfuric acid at the outlet of the bottom of E-3 was discharged out of the boarder area after cooling down adjusting the content; noncondensable gas at the outlet of E-3 was congealed via C-1 and the $H_2SO_4$ aerosol was collected from the noncondensable gas, and then noncondensable gas was sent to chimney to release. The pollutants concentrations strictly meet environmental protection standard, i.e. the content of $NO_2$ is 30 mg/Nm³, the content of $SO_2$ is 520 mg/Nm³, and the content of $H_2S$ is less than 10 ppmV.

The invention claimed is:

1. A method for preparing sulfuric acid by using hydrogen sulfide, characterized in that, comprising the following steps:
    (1) performing a oxidation-reduction reaction between an $H_2S$ feed gas and oxygen comprised in an oxygen-rich air to prepare $SO_2$, controlling residual oxygen after the oxidation-reduction reaction step at a molar percentage of ≥2%; wherein, if the molar percentage of $H_2S$ in the $H_2S$ feed gas is ≥8%, the oxidation-reduction reaction is a combustion reaction, the reaction temperature of which is ≥900° C.; if the molar percentage of $H_2S$ in the $H_2S$ feed gas is <8%, the oxidation-reduction reaction is a catalyzed reaction, the initiation temperature of which is ≥200° C.;
    (2) cooling the product acquired in step (1) to a temperature of 390° C.~430° C., and then performing a catalyzed oxidation reaction with oxygen, wherein the catalyzed oxidation reaction is performed in stages until the conversion rate of $SO_2$ is ≥98.7% or the outlet concentration of $SO_2$ is ≤550 mg/Nm³;
    (3) cooling the product acquired in step (2) to a temperature ≥10° C. over the dew point temperature of $H_2SO_4$, then further cooling to a temperature of 60° C.~120° C., collecting $H_2SO_4$ product, and subjecting the gas acquired after cooling to a coalescent separation before discharging directly into the atmosphere.

2. The method according to claim 1, characterized in that, the $H_2S$ content of the $H_2S$ feed gas is at a molar percentage of 1%~90%; when the oxidation-reduction reaction is a combustion reaction, the reaction temperature is 1050° C.; when the $H_2S$ feed gas contains $NH_3$, the content of $NH_3$ is at a molar percentage of ≤15%, and the content of $H_2S$ is at a molar percentage of ≥8%, the reaction temperature of the combustion reaction is ≥1250° C.; the oxygen-rich air is the air with the molar percentage of oxygen ranging between 20.8% and 100%.

3. The method according to claim 1, characterized in that, the residual oxygen after the oxidation-reduction reaction of step (1) is at a molar percentage of 2%~10%.

4. The method according to claim 1, characterized in that, the cooling temperature for the product acquired in step (1) is 410-420° C.; in the catalyzed oxidation reaction of step (2), the oxygen content is at a molar percentage of ≥5%, and the content of $SO_2$ is at a molar percentage of ≤4%; the number of reaction order of the catalyzed oxidation reaction is 2~5; the catalyzed oxidation reaction is performed in stages until the conversion rate of $SO_2$ is ≥99%.

5. The method according to claim 1, characterized in that, when the $H_2S$ feed gas contains $NH_3$, 50-100 ppmV ammonia gas is added to carry out the catalyzed oxidation reaction in the catalyzed oxidation reaction of step (2).

6. The method according to claim 1, characterized in that, the cooling step in step (2) is performed by using a heat exchanger or by adding air directly, if the heat exchanger is used for cooling, process gas or mesolow saturated vapor can be used as cooling medium, wherein the mesolow saturated vapor refers to a saturated vapor with the pressure of 0.5 MpaG to 7.8 MpaG.

7. The method according to claim 1, characterized in that, in step (3), the product acquired in step (2) is cooled to 10° C.-30° C. over the dew point temperature of $H_2SO_4$; and the said further cooling temperature is 105° C.-120° C.

8. The method according to claim 1, characterized in that, in step (3), a heat exchanger is used to cool the product acquired in step (2) to a temperature that is greater than or equal to 10° C. over the dew point temperature of $H_2SO_4$, and process gas or mesolow saturated vapor is used as cooling medium, wherein the mesolow saturated vapor refers to a saturated vapor with the pressure of 0.5 MpaG to 7.8 MpaG.

9. The method according to claim 1, characterized in that, the equipment used for further cooling to a temperature of 60° C.~120° C. in step (3) is a heat exchanger; the heat exchanger comprises a housing, on the top of which there is an exhaust port, and at the bottom of which there is a liquid outlet; there are several glass pipes for the circulation of cooling medium along the long axis of the housing on the inside of the housing; the said glass pipes span over from one sidewall of the housing to the other; the end of the glass pipe that is in the upstream of cooling medium is called the head end, and the other end of the glass pipe that is in the downstream of cooling medium is called the tail end; adjacent glass pipes between the upstream and downstream of cooling medium are connected head-to-tail to form at least one unidirectional flow path of cooling medium.

10. The method according to claim 9, characterized in that, there is a cooling medium inlet and a cooling medium outlet on the flow path, the inlet is near to the top of the flow path and the outlet is near to the bottom of the flow path;
    the extension direction of the glass pipes is vertical with the long axis direction, and both head ends and tail ends of the glass pipes extend to the outside of corresponding sidewalls;
    the glass pipes, which are uniformly distributed, are divided into several glass pipes units along the long axis direction; the head ends of the glass pipes in each unit are on the same side and form the head end of the glass pipes unit, and the side of the tail ends of the glass pipes in each unit forms the tail end of the unit; the tail end and the head end of the adjacent glass pipes unit which lay between the upstream and downstream of cooling medium are arranged in dislocation and connected via a pipe-box.

11. A heat exchanger, characterized in that, comprising a housing, on the top of which there is an exhaust port, and at the bottom of which there is a liquid outlet; there are several glass pipes for the circulation of cooling medium along the long axis of the housing on the inside of the housing, the said glass pipes span over from one sidewall of the housing to the other; the end of the glass pipe that is in the upstream of cooling medium is called the head end, and the other end of the glass pipe that is in the downstream of cooling medium is called the tail end; adjacent glass pipes between the upstream and downstream of cooling medium are connected head-to-tail to form at least one unidirectional flow path of cooling medium.

12. The heat exchanger according to claim 11, characterized in that, the extension direction of the glass pipes is vertical with the long axis direction, and both head and tail ends of the glass pipes extend to the outside of corresponding sidewalls;

the glass pipes, which are uniformly distributed equidistantly, are divided into several glass pipes units along the long axis direction; the head ends of the glass pipes in each unit are on the same side and form the head end of the glass pipes unit, and the side of the tail ends of the glass pipes in each unit forms the tail end of the unit; the tail end and the head end of the adjacent unit which lay between the upstream and downstream of cooling medium are arranged in dislocation and connected via a pipe-box.

13. The method according to claim 2, characterized in that, the $H_2S$ content of the $H_2S$ feed gas is at a molar percentage of 5.2%~28.9%; and when the $H_2S$ feed gas contains $NH_3$, the content of $NH_3$ is at a molar percentage of 1.2%.

14. The method according to claim 3, characterized in that, the residual oxygen after the oxidation-reduction reaction of step (1) is at a molar percentage of 2%~6%.

15. The method according to claim 14, characterized in that, the residual oxygen after the oxidation-reduction reaction of step (1) is at a molar percentage of 2%~3%.

16. The method according to claim 1, characterized in that, in the catalyzed oxygen reaction of step (2), the oxygen content is at a molar percentage of 5%~7%; and the number of reaction order of the catalyzed oxidation reaction is 3~4.

17. The method according to claim 1, characterized in that, in step (3), the product acquired in step (2) is cooled to 15° C.-17° C. over the dew point temperature of $H_2SO_4$.

* * * * *